United States Patent
Park et al.

(10) Patent No.: US 9,644,629 B2
(45) Date of Patent: May 9, 2017

(54) SCROLL COMPRESSOR HAVING A BEARING LUBRICATING LAYER

(71) Applicant: LG ELECTRONICS INC.

(72) Inventors: Jinsung Park, Seoul (KR); Eunsoo Yang, Seoul (KR); Chuljig Bae, Seoul (KR); Byeongchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/031,443

(22) Filed: Sep. 19, 2013

(65) Prior Publication Data
US 2014/0086775 A1 Mar. 27, 2014

(30) Foreign Application Priority Data

Sep. 24, 2012 (KR) .................. 10-2012-0106073

(51) Int. Cl.
*F01C 1/02* (2006.01)
*F03C 2/00* (2006.01)
(Continued)

(52) U.S. Cl.
CPC .......... *F04C 29/02* (2013.01); *F04C 18/0215* (2013.01); *F04C 23/008* (2013.01);
(Continued)

(58) Field of Classification Search
CPC F04C 18/0215; F04C 18/0246; F04C 23/008; F04C 29/02; F04C 2230/92; F04C 2230/602; F04C 2240/54; F05C 2225/12
(Continued)

(56) References Cited

U.S. PATENT DOCUMENTS

| 4,957,817 A * | 9/1990 | Chau .................. B01D 67/0011 |
| | | 428/436 |
| 2006/0194021 A1* | 8/2006 | Takeda et al. ................ 428/141 |

(Continued)

FOREIGN PATENT DOCUMENTS

| CN | 101375055 | 2/2009 |
| CN | 102678550 | 9/2012 |

(Continued)

OTHER PUBLICATIONS

Korean Notice of Allowance dated Mar. 18, 2014, cited in Application No. 10-2012-0106073.
(Continued)

*Primary Examiner* — Theresa Trieu
(74) *Attorney, Agent, or Firm* — Ked & Associates LLP

(57) ABSTRACT

A scroll compressor having a bearing is provided. The scroll compressor includes: a casing; a main frame fixed to the casing and having a shaft insertion hole formed therein; a fixed scroll fixed to the casing and disposed above the main frame; an orbiting scroll forming a compression chamber together with the fixed scroll and having a boss portion formed on a lower surface thereof; a rotational shaft having an end portion insertedly fixed in the boss portion in a state in which the rotational shaft is insertedly positioned in the shaft insertion hole; and a lubricating layer made of a PEEK material and formed in the shaft insertion hole or the boss portion, wherein the lubricating layer is formed by applying a liquid material to the shaft insertion hole or the boss portion.

14 Claims, 3 Drawing Sheets

(51) Int. Cl.
*F03C 4/00* (2006.01)
*F04C 2/00* (2006.01)
*F04C 29/02* (2006.01)
*F04C 18/02* (2006.01)
*F04C 23/00* (2006.01)

(52) U.S. Cl.
CPC .... *F04C 2230/602* (2013.01); *F04C 2230/92* (2013.01); *F04C 2240/54* (2013.01); *F05C 2225/12* (2013.01)

(58) Field of Classification Search
USPC ............... 418/152, 178–179, 55.1–55.6, 270
See application file for complete search history.

(56) References Cited

U.S. PATENT DOCUMENTS

2007/0031275 A1* 2/2007 Nogawa et al. ............. 418/55.2
2009/0297859 A1* 12/2009 Ohkawa et al. ............. 428/422
2010/0284844 A1* 11/2010 Yamaji et al. ............... 418/55.1
2013/0195707 A1* 8/2013 Kozuma ............. F04C 18/0215
418/55.1

FOREIGN PATENT DOCUMENTS

| | | |
|---|---|---|
| DE | 102 25 774 | 12/2003 |
| JP | 09-088851 | 3/1997 |
| JP | 2003003970 | 1/2003 |
| KR | 10-2005-0058609 A | 6/2005 |
| KR | 10-0984498 | 10/2010 |
| KR | 10-1059880 | 8/2011 |
| WO | WO 2012/020740 | 2/2012 |

OTHER PUBLICATIONS

Korean Office Action dated Aug. 26, 2013.
Chinese Office Action dated Aug. 17, 2015 (English translation).

* cited by examiner

SCROLL COMPRESSOR HAVING A BEARING LUBRICATING LAYER

CROSS-REFERENCE TO RELATED APPLICATION

Pursuant to 35 U.S.C. §119(a), this application claims the benefit of earlier filing date and right of priority to Korean Application No. 10-2012-0106073, filed on Sep. 24, 2012, the contents of which is incorporated by reference herein in its entirety.

BACKGROUND OF THE INVENTION

1. Field of the Invention

The present disclosure relates to a scroll compressor having a bearing, and more particularly, to a scroll compressor having a bearing which is interposed between a rotational shaft of the scroll compressor and an orbiting scroll to reduce friction loss.

2. Background of the Invention

A scroll compressor is a compressor which includes a fixed scroll having a fixed wrap and an orbiting scroll having an orbiting wrap engaged with the fixed wrap, in which as the orbiting scroll makes an orbiting movement on the fixed scroll, a compression chamber formed between the fixed wrap and the orbiting wrap is continuously changed to thus suck and compress a refrigerant.

A scroll compressor continuously performs sucking, compressing, and discharging, and thus, it is superior to other compressors in terms of vibration and noise generated during an operation process.

Behavior characteristics of a scroll compressor are determined by the configuration of the fixed wrap and the orbiting wrap. The fixed wrap and the orbiting wrap may have a certain shape, respectively, but in general, the fixed wrap and the orbiting wrap have a form of an easily processable involute curve. In the case of using an involute curve, a thickness of the wraps is uniform and a rate of change in volume according to a rotation angle of the orbiting scroll is also uniform, and thus, in order to obtain a sufficient degree of compression ratio, the number of windings of the wraps should be increased. In this case, however, a size of the compressor is also increased as the number of windings of the wraps is increased.

Meanwhile, the orbiting scroll includes a disk having a disk-like shape and the foregoing orbiting wrap formed at one side of the disk. A boss portion is formed in a rear surface on which the orbiting wrap is not formed, to connect the orbiting scroll to a rotational shaft rotationally driving the orbiting scroll. This configuration is advantageous in that the orbiting wrap is formed over the substantially entire area of the disk, and thus, a diameter of the disk for obtaining the same compression ratio can be reduced, but disadvantageous in that a point of application to which repulsive power of a refrigerant and a point of application to which reaction force is applied to cancel out the repulsive power in the event of compression are separated from one another in a vertical direction, to cause the orbiting scroll to be inclined during an operation, increasing vibrations and noise.

As a solution, a scroll compressor in which a rotational shaft and an orbiting scroll are coupled in a surface on which an orbiting wrap is formed has been presented. In this compressor, a point of application of repulsive power of a refrigerant and a point of application of reaction force thereof are applied to the same point, solving the problem in which the orbiting scroll is inclined.

However, in the case in which the rotational shaft extends to the orbiting wrap portion, a central point of the orbiting scroll cannot be utilized as a compression space, and thus, in order to obtain the same level of compression ratio as that of the related art compressor, sizes of the orbiting scroll and the fixed scroll should be increased. This disadvantageously leads to an increase in a size and weight of the compressor.

The above references are incorporated by reference herein where appropriate for appropriate teachings of additional or alternative details, features and/or technical background.

SUMMARY OF THE INVENTION

Therefore, an aspect of the detailed description is to provide a scroll compressor capable of reducing a size of an orbiting scroll and a fixed scroll without loss of a compression ratio.

To achieve these and other advantages and in accordance with the purpose of this specification, as embodied and broadly described herein, a scroll compressor includes: a casing; a main frame fixed to the casing and having a shaft insertion hole formed therein; a fixed scroll fixed to the casing and disposed above the main frame; an orbiting scroll forming a compression chamber together with the fixed scroll and having a boss portion formed on a lower surface thereof; a rotational shaft having an end portion insertedly fixed in the boss portion in a state in which the rotational shaft is insertedly positioned in the shaft insertion hole; and a lubricating layer made of a PEEK material and formed in the shaft insertion hole or the boss portion, wherein the lubricating layer is formed by applying a liquid material to the shaft insertion hole or the boss portion.

To achieve these and other advantages and in accordance with the purpose of this specification, as embodied and broadly described herein, a scroll compressor includes: a casing; a fixed scroll fixed to the casing and having a shaft insertion formed therein; an orbiting scroll disposed above the fixed scroll to form a compression chamber together with the fixed scroll and having a boss portion; a rotational shaft having an upper end portion penetrating through the shaft insertion hole and inserted in the boss portion; and a lubricating layer made of a PEEK material and formed in the shaft insertion hole or the boss portion, wherein the lubricating layer is formed by applying a liquid material to the shaft insertion hole or the boss portion.

In the above aspects of the present invention, in lubricating a contact surface between the rotational shaft and the main frame and a contact surface between the rotational shaft and the orbiting scroll, the lubricating layer made of a PEEK material is formed on the surface of the main frame or the orbiting scroll, in place of an existing bearing.

A primer layer may be formed between the lubricating layer and a surface of the shaft insertion hole or between the lubricating layer and a surface of the boss portion.

A thickness of the primer layer may range from 3 μm to 5 μm.

The lubricating layer may include a plurality of layers made of the same material. A thickness of the lubricating layer may range from 55 μm to 165 μm.

The liquid material may be formed by dispersing PEEK powder in an organic solvent.

According to embodiments of the present invention, since the lubricating layer made of a PEEK material is provided to replace a bearing formed as a separate member in the related art, a size of the scroll compressor can be reduced by the thickness of the omitted bearing. In addition, a number of winding of the fixed wrap and the orbiting wrap can be increased by the thickness of the omitted bearing, thus providing a higher compression ratio for the same size.

In addition, since the assembling process related to insertion of a bearing is simplified, assembling characteristics can be improved and manufacturing cost can be reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

The embodiments will be described in detail with reference to the following drawings in which like reference numerals refer to like elements wherein:

In the drawings:

FIG. 1 is a cross-sectional view illustrating a first example of a scroll compressor according to an embodiment of the present invention.

FIG. 2 is an enlarged cross-sectional view of a first bearing portion of FIG. 1.

FIG. 3 is a graph showing an amount of abrasion of a lubricating layer over an operation time.

FIG. 4 is a cross-sectional view illustrating a second example of a scroll compressor according to an embodiment of the present invention.

DETAILED DESCRIPTION OF THE INVENTION

A scroll compressor according to an embodiment of the present invention will be described in detail with reference to the accompanying drawings.

Figure 1:
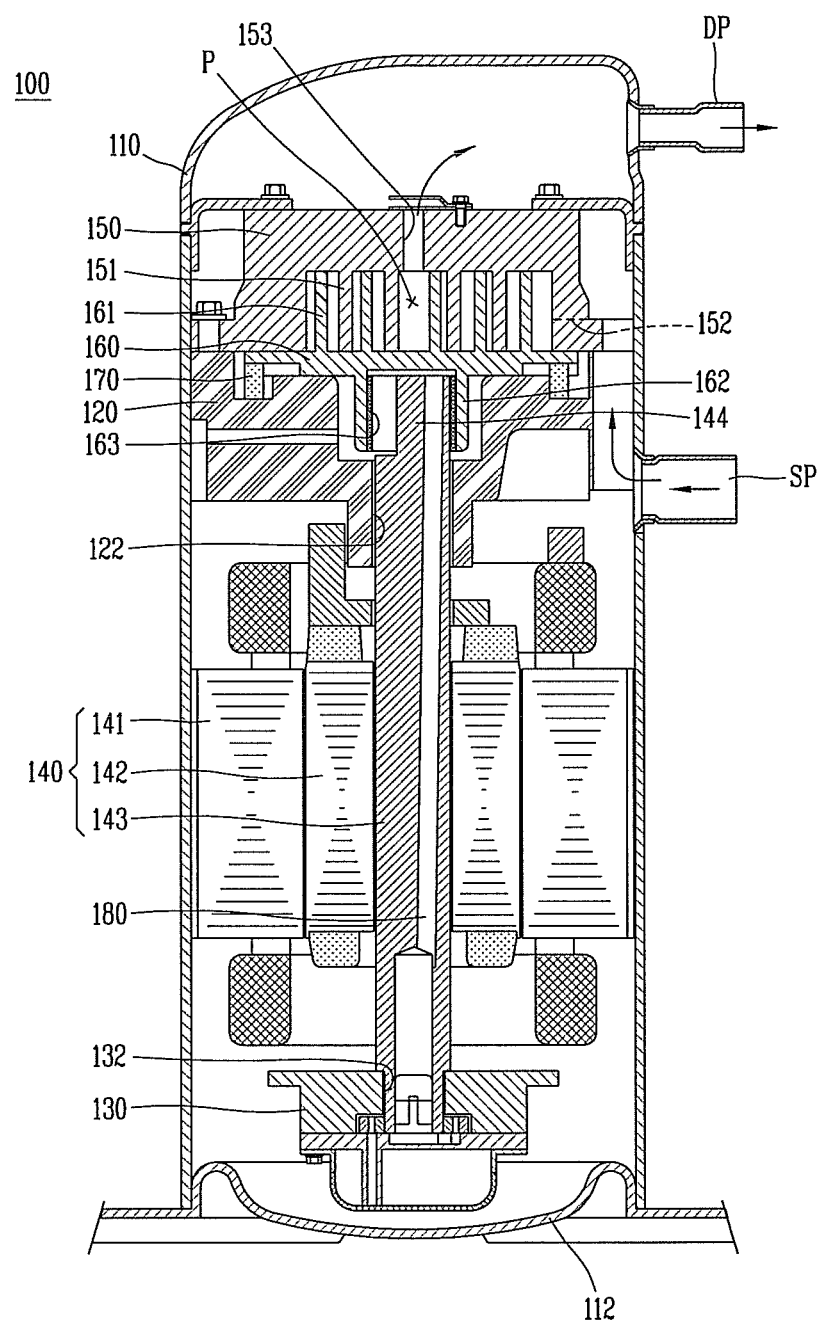

FIG. 1 is an internal cross-sectional view illustrating a first example of a scroll compressor according to an embodiment of the present invention. Here, the present inventive concept is not necessarily limited to the scroll compressor and, obviously, may be applied to any type of compressor using a bearing to reduce frictional resistance with respect to a rotational shaft. Referring to FIG. 1, in a scroll compressor 100 according to an embodiment of the present invention, a main frame 120 and a subframe 130 are installed within an airtight container 110, a driving motor 140 as an electric unit is installed between the main frame 120 and the subframe 130, and a compression unit including a fixed scroll 150 and an orbiting scroll 160 are installed above the main frame 120 and coupled to the driving motor 140 to compress a refrigerant.

The driving motor 140 includes a stator 141 around which a coil is wound, a rotor 142 rotatably inserted into the stator 141, and a rotational shaft 143 press-fit to the center of the rotor 142 to transmit rotary power to a compression mechanism unit. The rotational shaft 143 has a driving pin portion 144 formed to be protruded from an upper end thereof such that it is eccentric with respect to a rotation center thereof.

The compression mechanism unit includes the fixed scroll 150 fixed to an upper surface of the main frame 120, the orbiting scroll 160 mounted on the upper surface of the main frame 120 such that it is engaged with the fixed scroll 150, and an oldhamring 170 disposed between the orbiting scroll 160 and the main frame 120 to prevent rotation of the orbiting scroll 160.

The fixed scroll 150 includes a fixed wrap 151 wound in a spiral manner to configure a compression chamber P together with an orbiting wrap 161, and the orbiting scroll 160 includes an orbiting wrap 161 wound in a spiral manner and engaged with a fixed wrap 151 to form the compression chamber P. A boss portion 162 is protruded from a lower surface of the orbiting scroll 160, namely, from the opposite side of the orbiting wrap 161, and coupled to the rotational shaft 143 to receive rotator power therefrom.

A first bearing layer 163 is formed within the boss portion 162 of the orbiting scroll 160 such that it faces an outer circumferential surface of the driving pin portion 144 of the rotational shaft 143. The first bearing layer 163 is formed by coating an inner surface of the boss portion 162 with a coating material, and serves to reduce frictional contact between the rotational shaft 143 and the orbiting scroll 160. Also, a second bearing layer 122 is formed within the main frame 120 to reduce frictional contact between the rotational shaft 143 and the main frame 120, and a third bearing layer 132 is installed within the subframe 130. Oil is supplied to allow the first, second, and third bearing layers 163, 122, and 132 to perform a smooth lubricating operation. The first, second, and third bearing layers 163, 122, and 132 will be described below.

When power is applied to the driving motor 140 and the rotational shaft 143 is rotated, the orbiting scroll 160 eccentrically coupled to the rotational shaft 143 makes a rotational movement (or an orbiting movement) along a predetermined trace, and as the compression chamber P formed between the orbiting scroll 160 and the fixed scroll 150 is continuously moved to the center of the rotational movement, a volume thereof is reduced to continuously suck, compress, and discharge a refrigerant.

In order to reduce frictional contact between the respective components of the compression unit, an appropriate amount of oil should be supplied thereto, and in this case, such oil is injected into and stored in a base 112 of the airtight container 110. The injected oil may be supplied to the interior of the compression unit and the first to third bearing layers through an oil flow path 180.

Reference numeral 152 denotes a suction opening, reference numeral 153 denotes a discharge opening, reference letters SP denotes a suction pipe, and reference letters DP denotes discharge pipe.

Figure 2:
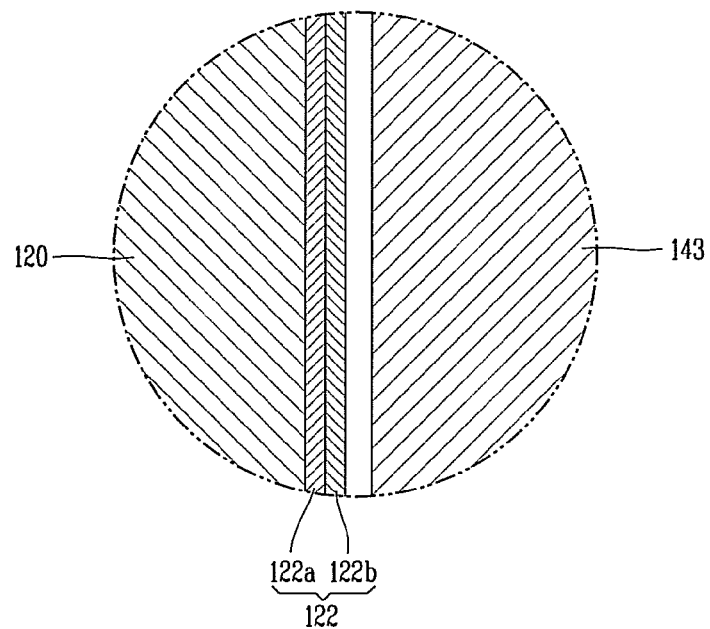

Here, the first to third bearing layers are made of Teflon or a PEEK material, and have an annular shape having an inner diameter corresponding to an outer circumferential surface of the rotational shaft 143, respectively. FIG. 2 is an enlarged cross-sectional view of the first bearing. Referring to FIG. 2, the second bearing layer 122 formed in the main frame 120 includes a primer layer 122a contiguous with a surface of the main frame 120 and a PEEK layer 122b positioned on a surface of the primer layer 122a.

The primer layer 122a is coated on a surface of the main frame 120 to cover fine recesses present on the surface and allow the PEEK layer 122b to be firmly bonded to the main frame 120. In this case, in order to increase bonding strength between the primer layer 122a and the main frame 120, the main frame is surface-treated before the primer layer 122a is coated, and in this case, sand blasting is one of surfacetreatment methods. The PEEK layer 122b is formed by applying a PEEK coating solution prepared by dispersing PEEK powder in an organic solvent to a surface of the primer layer 122a.

Here, the primer layer 122a is formed to have a thickness ranging from 3 μm to 5 μm, and the PEEK layer 122b is formed to have a thickness ranging from 55 μm to 165 μm. As described above, in forming the PEEK layer 122b, the PEEK coating solution is applied, and in this case, a minimum thickness of the PEEK layer 122b obtained by applying the PEEK coating solution once ranges from about 8 μm to 15 μm. Thus, a minimum thickness of the PEEK layer 122b may be 8 μm.

Figure 3:
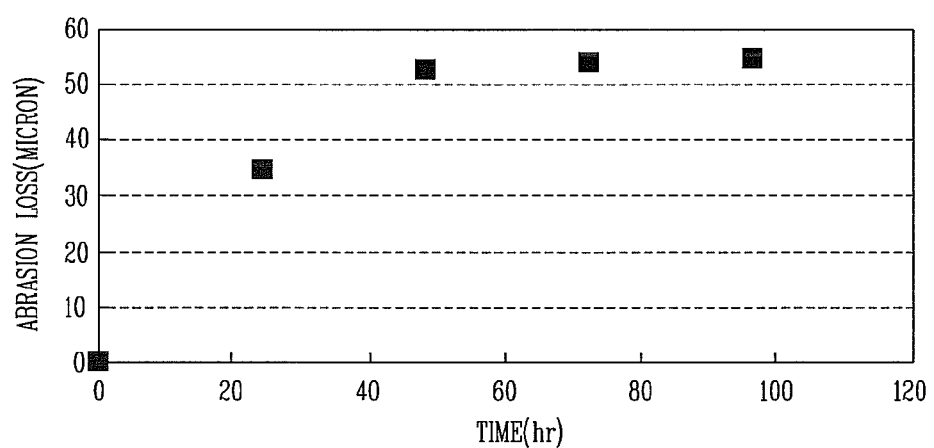

However, as illustrated in FIG. 3, a compressor was fabricated to have the first bearing layer as described above and operated at a speed of 60 Hz for ten seconds by applying a load of 3500N thereto and stopped for ten seconds repeatedly. The results showed that abrasion of the PEEK layer was about 55 μm, having a tendency of being stabilized. Thus, in order for the first bearing layer to stably perform an intended function thereof for a long period of time, it can be seen that a minimum thickness of the PEEK layer is required to be equal to or greater than 55 μm.

However, the compressor may be operated under a liquid compression condition in which abrasion may occur abruptly, a liquid starting condition, and a condition in which a temperature is higher than a pre-set temperature value, or under an overload condition. Thus, in order to maintain abrasion resistance performance under such a condition, preferably, the PEEK layer is required to have a value greater than the minimum thickness. According to results of experiment of the inventors of the present application, when the PEEK layer had a thickness of 165 μm, the PEEK layer maintained a sufficient level of abrasion resistance even under the unexpected conditions as mentioned above. Thus, a maximum thickness of the PEEK layer may be set to 165 μm.

As described above, since a minimum thickness of the PEEK layer formed by applying the PEEK coating solution once ranges from about 8 pm to 15 μm. Thus, in case of forming a PEEK layer having a thickness ranging from 55 μm to 165 μm, the PEEK coating solution may be applied to have the overall thickness at a time, but a method of forming the PEEK layer several times may also be considered. In this case, the PEEK layer may be formed to have an even thickness on the whole.

Meanwhile, according to results of measuring abrasion of a related art bearing made of a Teflon material and having a thickness of 2 mm under the same conditions as those of experiment of FIG. 3, it was noted that the bearing had abrasion of about 43 μm after the lapse of about 100 hours. Namely, it has a similar degree of abrasion to that of the bearing layer according to the first embodiment, but the bearing layer according to the first embodiment of the present invention has the similar abrasion resistance even with the thickness considerably smaller than that of the related art.

The reduced thickness may lead to a reduction in a size of the scroll compressor and may be utilized to provide a higher compression ratio over the same size. In addition, in the case of the scroll compressor, in order to prevent the orbiting scroll from retreating due to gas pressure, back pressure should be applied to a rear surface of the orbiting scroll. As the back pressure, a partial amount of compressed gas existing in the compression chamber is applied, and in the case of using the conventional bearing, it is difficult to increase a size of the bearing as large as desired due to the back pressure supply structure, but in the case of the embodiment, such a restriction in design can be eliminated.

Figure 4:
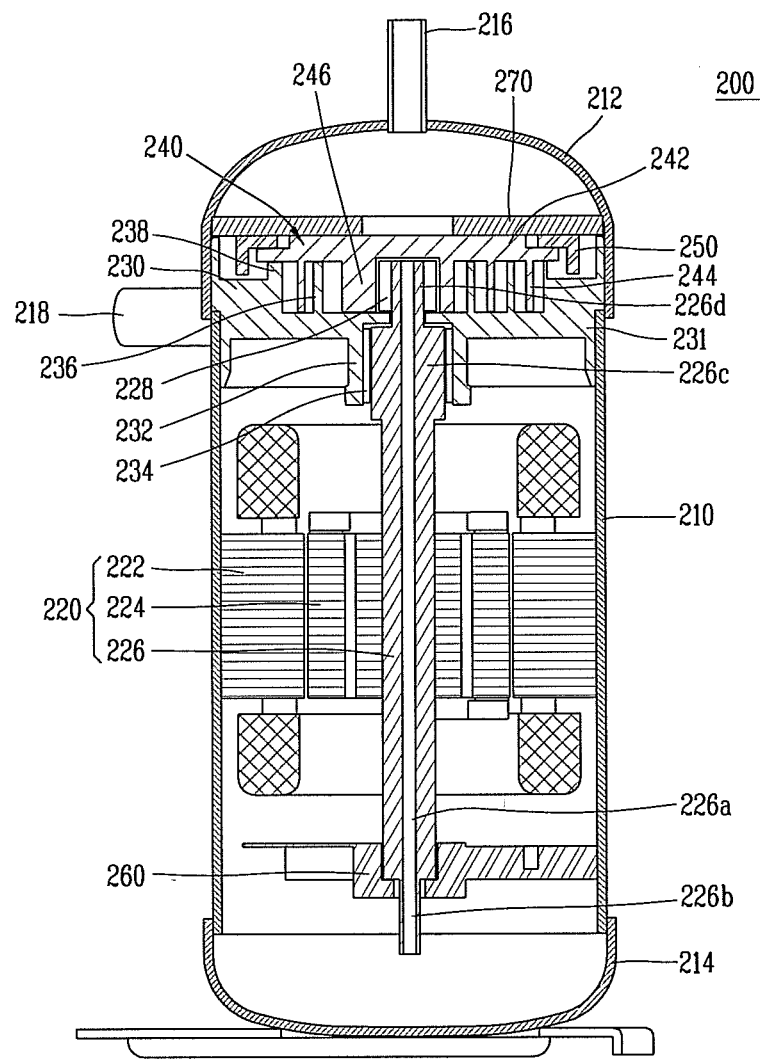

Meanwhile, the present invention may also be applied to a so-called 'shaft penetrating' scroll compressor in which a fixed scroll can double as a main frame, while omitting a main frame. The term 'shaft penetrating' is applied in consideration of the fact that a rotational shaft is inserted to penetrate through a disk of a fixed scroll. FIG. 4 illustrates a second example of a scroll compressor employing the inventive concept of the present invention.

Referring to FIG. 4, the scroll compressor 200 according to the second embodiment of the present invention includes an upper shell 212, a lower shell 214, and a casing 210. The upper shell 212 and the lower shell 214 are welded to the casing 210 to form an airtight space together with the casing 210.

A discharge pipe 216 is installed on an upper portion of the upper shell 212. The discharge pipe 216 is a passage through which a compressed refrigerant is discharged to the outside, and an oil separator (not shown) for separating oil mixed in the discharged refrigerant may be connected to the discharge pipe 216. A suction pipe 218 is installed on a lateral surface of the casing 210. The suction pipe 218 is a passage through which a refrigerant to be compressed is introduced. In FIG. 4, the suction pipe 218 is positioned in a boundary surface between the casing 210 and the upper shell 212, but a position thereof may be arbitrarily set. In addition, the lower shell 214 may also serve as an oil chamber for storing oil supplied to allow the compressor to be smoothly operated.

A motor 220 as a driving unit is installed in a substantially central portion within the casing 210. The motor 220 includes a stator 222 fixed to an inner surface of the casing 210 and a rotor 224 positioned within the stator 222 and rotated according to an interaction with the stator 222. A rotational shaft 226 is disposed in the center of the rotor 224, and the rotor 224 and the rotational shaft 226 are rotated together.

An oil flow path 226a is formed in a central portion of the rotational shaft 226 and extends in a length direction of the rotational shaft 226, and an oil pump 226b is installed in a lower end portion of the rotational shaft 226 to supply oil stored in the lower shell 214 upwardly. The oil pump 22b may be configured to have a recess having a spiral form within the oil flow path. Alternatively, the oil pump 22b may include an impeller, or a positive displacement pump may be installed as the oil pump.

A enlarged diameter portion 226c is disposed in an upper end portion of the rotational shaft 226 such that it is insertedly positioned within a boss portion formed in the fixed scroll as described hereinafter. The enlarged diameter portion 226c is formed to have a diameter larger than those of other portions, and a pin portion 226d is formed in an end portion of the enlarged diameter portion 226c. An eccentric bearing layer 228 is inserted into the pin portion 226d.

A fixed scroll 230 is installed in a boundary portion between the casing 210 and the upper shell 212. The fixed scroll 230 is press-fit to be fixed in a shrinkage fitting manner between the casing 210 and the upper shell 21 or may be coupled together with the casing 210 and the upper shell 212 through welding.

A boss portion 232 is formed on a lower surface of the fixed scroll 230, in which the rotational shaft 226 is inserted. A through hole is formed on an upper surface (on the basis of FIG. 4) of the boss portion 232 to allow the pin portion 226d to penetrate therethrough. Accordingly, the pin portion 226d is protruded upwardly from a disk 231 of the fixed scroll 230 through the through hole. A first bearing layer 234 for reducing frictional contact with the rotational shaft 226 is installed on an inner surface of the boss portion 232.

A fixed wrap 236 is formed on an upper surface of the disk 231 and enmeshed (or engaged) with an orbiting wrap as described hereinafter to form a compression chamber. A space portion accommodating an orbiting scroll 240 as described hereinafter is formed on an outer circumferential portion of the disk 231, and a side wall portion 38 is formed to be contiguous with an inner circumferential surface of the casing 210.

The orbiting scroll 240 is installed above the fixed scroll 230. The orbiting scroll 240 includes a disk 242 having a substantially circular shape and an orbiting wrap 244 enmeshed with the fixed wrap 236. A rotational shaft coupling portion 246 having a substantially circular shape is formed in a central portion of the disk 242 to allow the eccentric bearing layer 228 is rotatably inserted and fixed therein. An outer circumferential portion of the rotational shaft coupling portion 246 is connected to the orbiting wrap, so it serves to form the compression chamber together with the fixed wrap during a compression process.

Meanwhile, since the eccentric bearing layer 228 is inserted into the rotational shaft coupling portion 246, an end portion of the rotational shaft 226 is inserted through the disk of the fixed scroll 230, and the orbiting wrap, the fixed wrap, and the eccentric bearing layer 228 are installed to overlap in an lateral direction of the compressor. During a compressing operation, repulsive power of a refrigerant is applied to the fixed wrap and the orbiting wrap, and compressive force is applied between the rotational shaft support portion and the eccentric bearing layer as reaction force. In the case in which a portion of the shaft penetrates the disk to overlap with the wrap, repulsive power and compressive force of the refrigerant are applied to the same side on the basis of the disk, which are, thus, canceled out. Accordingly, the orbiting scroll may be prevented from tilting due to the action of the compressive force and repulsive power.

Although not shown, a discharge hole may be formed on the disk 242 to allow a compressed refrigerant to be discharged into the casing 210. A position of the discharge hole may be set arbitrarily in consideration of a required discharge pressure, and the like.

An oldhamring 250 is installed in an upper portion of the orbiting scroll 240 in order to prevent rotation of the orbiting scroll 240. Meanwhile, a lower frame 260 is installed in a lower portion of the casing 210 to rotatably support the lower side of the rotational shaft 226, and an upper frame 270 is installed in an upper portion of the orbiting scroll 240 in order to support the orbiting scroll 240 and the oldhamring 250. A hold is formed in the center of the upper frame 270. The hole communicates with the discharge hole of the orbiting scroll 240 to discharge a compressed refrigerant to the upper shell 212.

In the scroll compressor according to the second embodiment of the present invention configured as described above, the eccentric bearing layer 228 and the first bearing 234 have the same shape and are formed of the same material as those of the scroll compressor according to the first embodiment of the present invention. In particular, in the case of the scroll compressor according to the second embodiment, since the rotational shaft coupling portion is positioned in the central portion of the orbiting scroll 240, a space to be utilized as a compressive space in the disk of the orbiting scroll 240 can be significantly reduced. Thus, in general, the shaft penetrating-type scroll compressor should be increased in size to obtain the same compression ratio, relative to an otherwise compressor, but according to an embodiment of the present invention, since the thickness of the bearing is reduced to half or less of that of the related art, an increase in the size of the scroll compressor can be minimized.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A scroll compressor, comprising:
   a casing;
   a main frame fixed to the casing and having a shaft insertion hole formed therein;
   a fixed scroll fixed to the casing and disposed above the main frame;
   an orbiting scroll forming a compression chamber together with the fixed scroll and having a boss formed on a lower surface thereof;
   a rotational shaft having an end insertedly fixed in the boss of the orbiting scroll in a state in which the rotational shaft is insertedly positioned in the shaft insertion hole of the main frame; and
   a lubricating layer made of a PEEK material and formed in the shaft insertion hole and the boss, respectively, wherein the lubricating layer is formed on an inner surface of the shaft insertion hole and an inner surface of the boss, wherein the lubricating layer includes an organic solvent and PEEK powder dispersed in the organic solvent, and wherein an inner surface of the lubricating layer faces the outer circumferential surface of the rotational shaft with a gap between the inner surface of the lubricant layer and the other circumferential surface of the rotational shaft.

2. The scroll compressor of claim 1, wherein a primer layer is formed between the lubricating layer and the inner surface of the shaft insertion hole and between the lubricating layer and the inner surface of the boss.

3. The scroll compressor of claim 2, wherein a thickness of the primer layer ranges from 3 µm to 5 µm.

4. The scroll compressor of claim 2, wherein the lubricating layer includes a plurality of layers made of a same material.

5. The scroll compressor of claim 2, wherein a thickness of the lubricating layer ranges from 55 µm to 165 µm.

6. The scroll compressor of claim 1, further including a subframe installed in the casing, wherein a drive motor is installed between the main frame and the subframe, wherein the lubricating layer is installed within the subframe, and wherein a lower end of the rotational shaft is rotatably inserted into the lubricating layer of the subframe.

7. The scroll compressor of claim 6, wherein the drive motor includes a stator fixed to the casing, a rotor rotatably inserted into the stator, and the rotational shaft insertedly fixed in the rotor.

8. The scroll compressor of claim 1, wherein the rotational shaft includes a drive pin that protrudes from an upper end of the rotational shaft, wherein the drive pin is eccentric with respect to a rotation center of the rotational shaft, and wherein the drive pin is insertedly fixed in the boss of the orbiting scroll.

9. A scroll compressor, comprising
 a casing;
 a fixed scroll fixed to the casing and having a shaft insertion hole formed therein;
 an orbiting scroll disposed above the fixed scroll to form a compression chamber together with the fixed scroll and having a boss;
 a rotational shaft having an upper end that penetrates through the shaft insertion hole of the fixed scroll and is inserted in the boss of the orbiting scroll; and
 a lubricating layer made of a PEEK material and formed in the shaft insertion hole and the boss, respectively, wherein the lubricating layer is formed on an inner surface of the shaft insertion hole and an inner surface of the boss, wherein the lubricating layer includes an organic solvent and PEEK powder dispersed in the organic solvent, and wherein an inner surface of the lubricating layer faces the outer circumferential surface of the rotational shaft with a gap between the inner surface of the lubricant layer and the other circumferential surface of the rotational shaft.

10. The scroll compressor of claim 9, wherein a primer layer is formed between the lubricating layer and the inner surface of the shaft insertion hole and between the lubricating layer and the inner surface of the boss.

11. The scroll compressor of claim 10, wherein a thickness of the primer layer ranges from 3 µm to 5 µm.

12. The scroll compressor of claim 10, wherein the lubricating layer includes a plurality of layers made of a same material.

13. The scroll compressor of claim 10, wherein a thickness of the lubricating layer ranges from 55 µm to 165 µm.

14. A scroll compressor, comprising:
 a casing;
 a main frame fixed to the casing and having a shaft insertion hole formed therein;
 a fixed scroll fixed to the casing and disposed above the main frame;
 an orbiting scroll forming a compression chamber together with the fixed scroll and having a boss formed on a lower surface thereof,
 a rotational shaft having an end insertedly fixed in the boss of the orbiting scroll in a state in which the rotational shaft is insertedly positioned in the shaft insertion hole of the main frame;
 a primer layer formed on an inner surface of the shaft insertion hole and an inner surface of the boss, respectively; and
 a lubricating layer coated on the primer layer, respectively, wherein the lubricating layer includes an organic solvent and PEEK powder dispersed in the organic solvent, and wherein an inner surface of the lubricating layer faces the outer circumferential surface of the rotational shaft with a gap between the inner surface of the lubricant layer and the other circumferential surface of the rotational shaft.

* * * * *